United States Patent [19]
Douglas

[11] 3,903,734
[45] Sept. 9, 1975

[54] TECHNIQUE FOR MEASURING THE COMPLEX SHEAR MODULUS UTILIZING LASER INTERFEROMETRY

[76] Inventor: Bruce E. Douglas, Rt. 1, Box 575, Edgewater, Md. 21034

[22] Filed: Feb. 11, 1974

[21] Appl. No.: 441,535

[52] U.S. Cl. .................. 73/99; 73/67.2; 73/101
[51] Int. Cl.² .................. G01N 3/32; G01M 7/00
[58] Field of Search .......... 73/67, 67.1, 67.2, 71.3, 73/99, 15.6, 101

[56] References Cited
UNITED STATES PATENTS

| | | | |
|---|---|---|---|
| 3,319,460 | 5/1967 | Barigant | 73/67.2 |
| 3,417,608 | 12/1968 | Barigant | 73/67.1 |
| 3,699,808 | 10/1972 | Ford et al. | 73/91 |
| 3,734,623 | 5/1973 | Wolber | 356/110 |
| 3,756,074 | 9/1973 | Hedvig et al. | 73/99 |
| 3,782,184 | 1/1974 | Shuck | 73/101 |

*Primary Examiner*—Richard C. Queisser
*Assistant Examiner*—John P. Beauchamp
*Attorney, Agent, or Firm*—R. S. Sciascia; Q. E. Hodges

[57] ABSTRACT

The dynamic complex shear modulus of a viscoelastic material is computed from three rotational deflection measurements on a circular rod of the material which is subjected to a torsional sinusoidal stress wave. A laser interferometer is proposed to make the three deflection measurements in combination with reflecting mirrors which are located at the top, half and quarter positions of the sample rod. The rod is secured at one end and free at the distal end where the torsional stress wave is applied. The placement of the mirrors at these positions provides a unique ability to determine the dynamic complex shear modulus with a simplicity and low degree of error heretofore unapproached.

2 Claims, 2 Drawing Figures

TECHNIQUE FOR MEASURING THE COMPLEX SHEAR MODULUS UTILIZING LASER INTERFEROMETRY

The invention described herein may be manufactured and used by and for the Government of the United States of America for governmental purposes without the payment of any royalties thereon or therefor.

BACKGROUND AND SUMMARY

Viscoelastic materials are commercially utilized to damp mechanical vibrations in resonant structures. In general, the design of a damping treatment which utilizes these materials requires that two of the material's dynamic complex moduli be known as a function of frequency and temperature. The invention described herein is a measuring technique for one of these moduli, the complex shear modulus, $G^*$. It utilizes a laser interferometer to measure three rotational vibrational displacements on a (fixed-free) viscoelastic rod which is subjected to a torsional sinusoidal stress load. Although several techniques exist for this type of measurement, by utilizing light, this technique measures this modulus over a wide range of enviromental conditions. It offers a precise, non-resonant method for determining the complex shear modulus of inherently damped materials which have a high real shear modulus. Experimentally, this procedure places a very small external mechanical load on the test sample, so as to minimize the effects of external mechanical loading.

DETAILED DESCRIPTION

Figure 1:
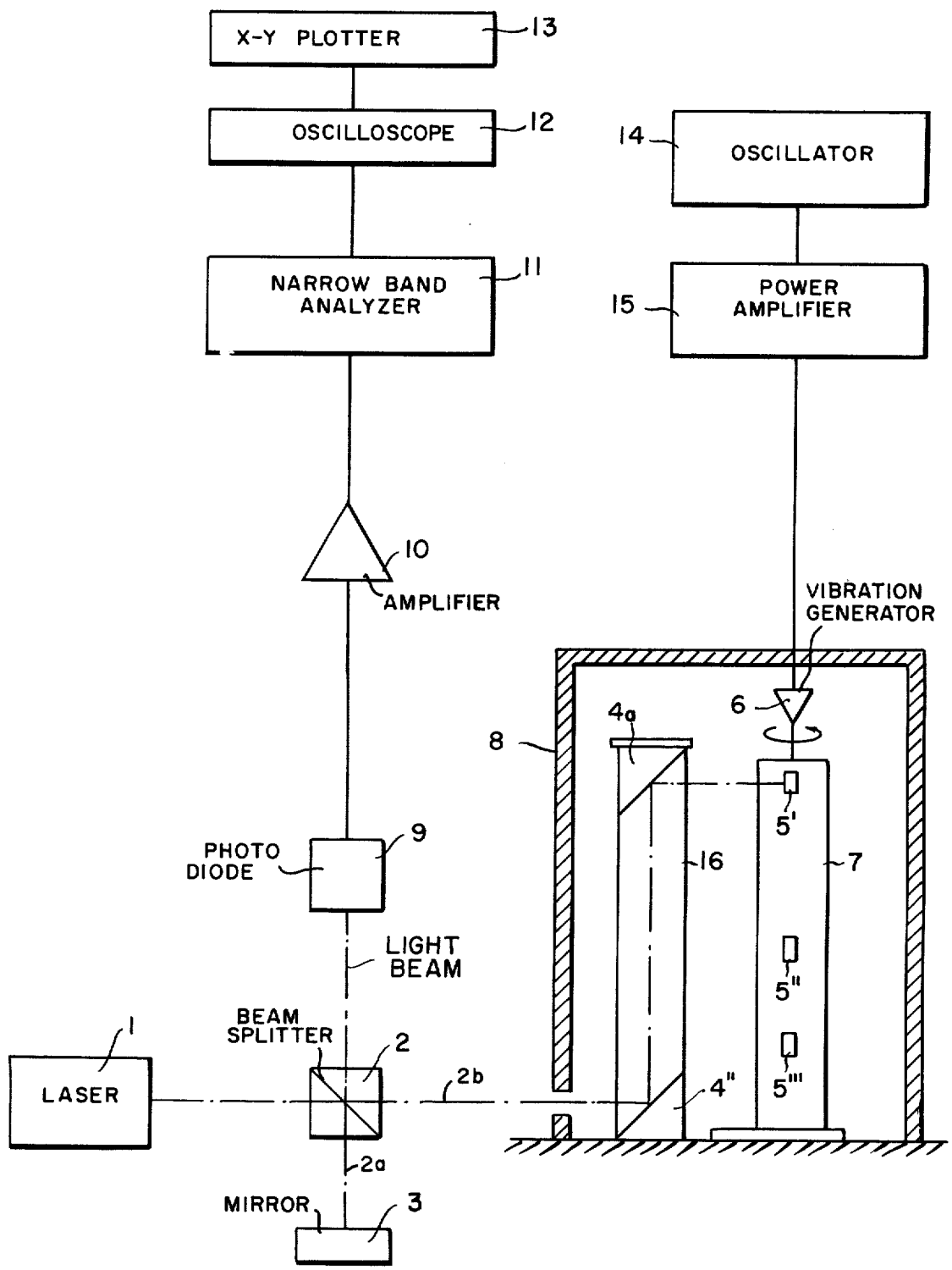
FIG. 1 is a diagram of the apparatus for measuring the complex shear modulus of a viscoelastic material.
Figure 2:
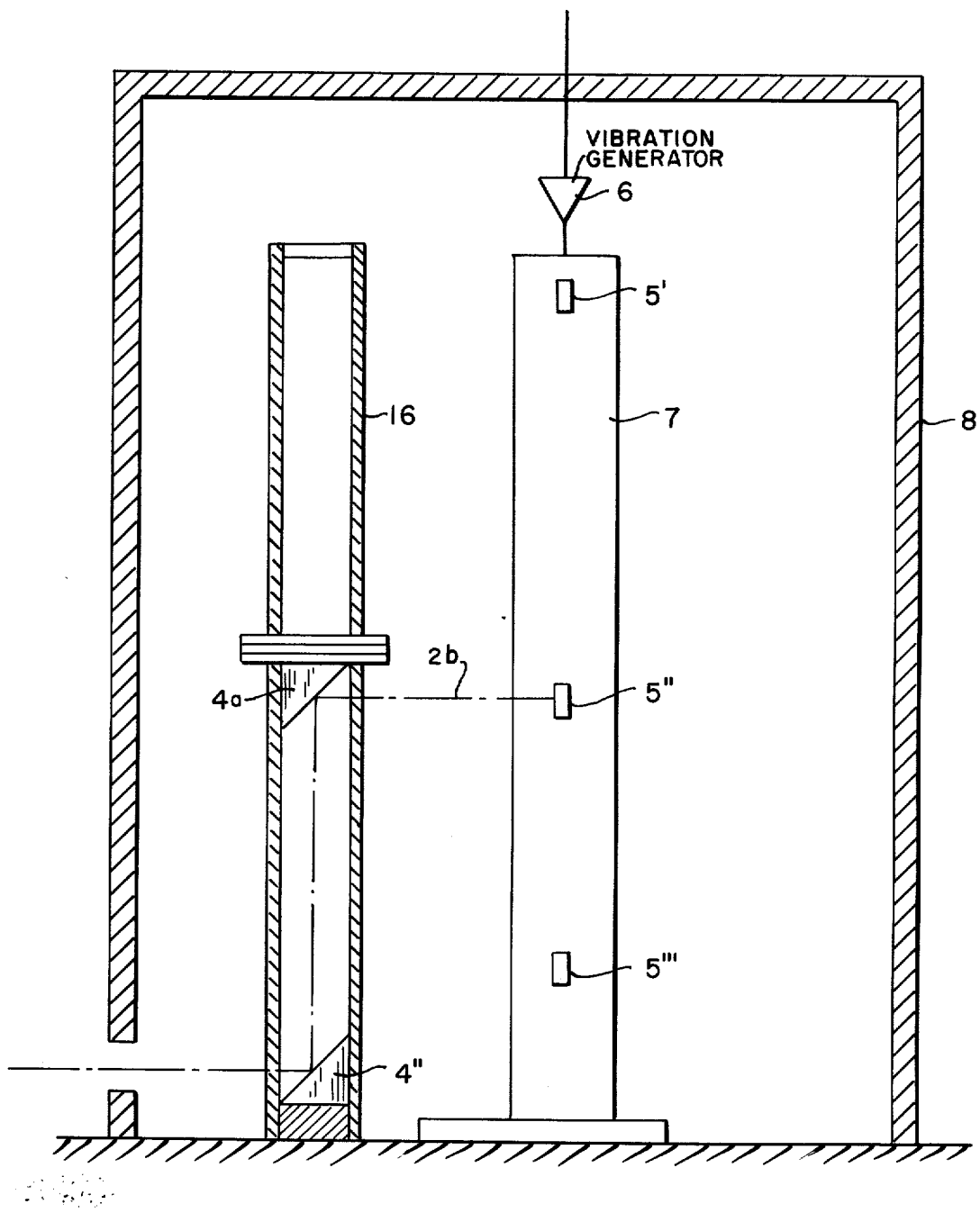
FIG. 2 is a more detailed diagram of the sensing portion of the apparatus.

Referring to FIG. 1, a laser 1 produces a coherent collimated beam of light which is divided at a beam splitter 2 into two beams $2a$ and $2b$, one of which $2a$ is reflected at a fixed mirror 3 back to the beam splitter where it recombines with the second beam $2b$ which is reflected from one of the mirrors $5'$, $5''$, $5'''$ 5 which are attached to the viscoelastic sample. FIG. 2 shows a more detailed depiction of mirror arrangement. A set of 90° reflecting mirrors 4 and $4a$ mounted in a tower structure 16 much like a periscope and wherein mirror $4a$ is vertically movable redirects the second beam $2b$ so that the mirrors at $5'$, $5''$, and $5'''$, attached to the rod 7 to measure rotational displacements, retroreflect the beam $2b$ back along the same path. The mirrors $5'$, $5''$, and $5'''$ must be attached to the rod 7 in a plane parallel to the direction of the axis of the rod. The two beams $2a$ and $2b$ then recombine at the beam splitter 2 where they produce interference fringes which are detected by a photodiode 9. It is to be understood that FIG. 1 and FIG. 2 respectively show for convenience examples where the 90° mirror $4a$ is at a position opposite only the mirrors $5'$ in FIG. 1 and $5''$ in FIG. 2 but is obviously slidable in the tower 16 to a position opposite the mirror $5'''$ also. A vibration generator 6 (a piezoelectric crystal or magnet driven by a coil) is mechanically attached to the viscoelastic circular rod 7 and driven by an oscillator 14 and power amplifier 15 to produce a torsional sinusoidal stress wave at the top of the rod 7. One possible way of obtaining a pure torsional sinusoidal stress wave is to mount two opposed electromagnetic vibration generators equidistant from the axis of the viscoelastic elastic rod and drive it in phase by an oscillator and power amplifier. The rod is enclosed by an environmental control chamber 8 primarily to control temperature. The three mirrors $5'$, $5''$, and $5'''$ are attached to the rod, having a length L; one at the free end to L, the half length position, L/2 and the quarter length position, L/4 from the fixed end of the rod. The mirrors $5'$, $5''$, and $5'''$, bonded to the rod, move so that the interference fringes they produce at the photodiode 9 measure the small rotational vibrational deflections of the rod at their points of attachment. The rotational displacement is designated $\theta_L$, $\theta_{L/2}$, and $\theta_{L/4}$ for the 3 positions referred to above, respectively, in the equations hereinafter.

The photodiode 9 electronically counts the fringes which gives an indirect reading of the displacement of the attached mirrors 5. The time varying photodiode voltage is then amplified by amplifier 10 and analyzed by a narrow-band filter 11 at the frequency of excitation of the rod or one of its harmonics. An oscilloscope 12 is connected to the narrowband analyzer for observation and adjustment of the analyzer 11 and an X-Y plotter 13 is connected to the oscilloscope 12 to record the photodiode output. One of the many standard techniques i.e. either the references or ratio method for calculating displacement from a suitable analyzed photodiode signal can then be employed to obtain the rotational displacement of each of the mirrors $5'$, $5''$, $5'''$ and, as a result, the rotational displacement of the rod at the point of attachment of each mirror. The points of mirror attachment are critical in that they enable the determination of the dynamic complex shear modulus in a relatively simple format. Thus, the measurements provide for the measurement of $G^*$ in a simple way which was heretofore unavailable.

Having obtained the set of three rotational deflection measurements $\theta_L$, $\theta_{L/2}$, $\theta_{L/4}$ by the standard methods described above, these readings can then be substituted into the expressions $$|R_2| = \frac{|\theta_{L/2}|}{|\theta_L|}, \text{ and, } |R_1| = \frac{|\theta_{L/4}|}{|\theta_{L/2}|}$$

to obtain $|R_2|$ and $|R_1|$ at the driving frequency, $f$, of the vibration generator. These values for $|R_2|$ and $|R_1|$ can then be substituted into the expressions $$A' = \frac{1}{4|R_1|^2}$$

$$A'' = \frac{1}{4}\left(\frac{2}{|R_2|^2} + \kappa \frac{1}{|R_1|^2}\right)^{1/2}$$

to obtain values of $A'$ and $A''$. The values of $A'$ and $A''$ together with knowledge of the mass density of the viscoelastic rod (which can be obtained by standard methods), the driving frequency and the length of the rod can then be used to determine the shear storage modulus $G'$ and the shear loss tangent $\beta$ of the viscoelastic rod at the frequency which the rod was driven and at the temperature under which the measurements were made.

A plot of frequency versus $|R_2|$ and $|R_1|$ can then be made from the rotational deflection measurements.

For frequencies up to the last maximum of $|R_4|$ spectrum, i.e., the highest identifiable mode of vibration of the rod the dynamic complex elastic modulus can be determined by $$G^* = \frac{\pi^2 f^2 L^2 \rho}{(1+\beta^2)^{1/2}} \frac{\sin^2(1/2 \arctan \beta)}{|\cosh^{-1}(A'+A'')|^2}(1+i\beta)$$

since $G^* = G^1(1+i\beta)$
and where:

$$\beta = 2\left[\frac{\cos^{-1}(A'-A'')+n\pi}{\cosh^{-1}(A'+A'')} - \frac{\cosh^{-1}(A'+A'')}{\cos^{-1}(A'-A'')+n\pi}\right]$$

and, $\rho$ = mass density of the rod;
$f$ = the frequency in Hertz; and,
$n$ = an integer whose absolute value is equal to the number of maxima in the $|R_2|$ spectrum below whose driven frequency $f$ and the sign is opposite the sign of the slope of $|R_2|$ at frequency $f$.

For frequencies above the frequency of the last maximum in $|R_4|$ spectrum, i.e., the highest identifiable mode of vibration of the rod, determine the dynamic complex shear modulus $G^*$ according to the following relationship:

$$G^* = \frac{c^2\rho}{(1+\beta^2)^{1/2}}(1+i\beta)$$

where, $$\beta = \tan\left\{2 \arcsin\left[\frac{-c}{\pi f L}\ln|R_2|\right]\right\};$$

where $c$ = the velocity of the torsional wave in the elastic media at frequency $f$ measured by well known laser interferometer techniques.

Obviously some modifications and variations of the present invention are possible in light of the above teachings. It is therefore to be understood that within the scope of the appended claims the invention may be practiced otherwise than as specifically described.

I claim:

1. A method for measuring the dynamic complex shear modulus of a viscoelastic material comprising the steps of:
    fixedly mounting a rod of circular cross section of the material with a length L at one of its ends;
    maintaining the rod at a predetermined temperature;
    introducing a sinusoidal torsional wave of a selected number of frequencies within a predetermined range of frequencies into the rod;
    measuring the deflection, $\theta L$, of the rod at its free end, at a point midway its length $\theta L/2$, and at a point one quarter of the length of the rod from its fixed end, $\theta L/4$, for each of the selected frequencies;
    A. for frequencies below the last maximum in $|R_4|$ determine the complex shear modulus $G^*$ for the given frequency $f$ according to the following relationship $$G^* = \frac{\pi^2 f^2 L^2 \rho}{(1+\beta^2)^{1/2}} \frac{\sin^2(1/2 \arctan \beta)}{|\cosh^{-1}(A'+A'')|^2}(1+i\beta)$$

where:

$$\beta = 2\left[\frac{\cos^{-1}(A'-A'')+n\pi}{\cosh^{-1}(A'+A'')} - \frac{\cosh^{-1}(A'+A'')}{\cos^{-1}(A'-A'')+n\pi}\right]$$

$$A' = \frac{1}{4|R_4|^2};$$

$$A'' = \frac{1}{4}\left(\frac{2}{|R_2|^2}+8-\frac{1}{|R_4|^2}\right)^{1/2}$$

$$|R_2| = \frac{\theta_{L/2}}{\theta_L};$$

$$|R_4| = \frac{\theta_{L/4}}{\theta_{L/2}};$$

$\rho$ = mass density of the rod;
$f$ = the frequency in Hertz; and
$n$ = an integer selected at the given frequency $f$ such that the absolute value of $n$ equals the number of peaks in $|R_2|$ for the $|R_2|$ spectrum below frequency $f$ and the sign of $n$ is minus the sign of the slope of $|R_2|$ for values of $f$ up to the last maximum in $|R_4|$ spectrum, i.e., the highest identifiable mode of vibration of the rod.

B. for frequencies above the last maximum in $|R_4|$ determine the dynamic complex shear modulus $G^*$ according to the following relationship:

$$G^* = \frac{c^2\rho}{(1+\beta^2)^{1/2}}(1+i\beta)$$

where:

$$\beta = \tan\left\{2 \arcsin\left[\frac{-c}{\pi f L}\ln|R_2|\right]\right\};$$

$c$ = the velocity of the torsional wave through the material at frequency $f$.

2. An apparatus for measuring the torsional displacement of a sample rod of viscoelastic under sinusoidal torsional waves at lineal points critical for the determination of the dynamic complex shear modulus of the material, comprising:
    an environmental housing for enclosing the sample rod and controlling the temperature thereof;
    means for securing one end of said rod in said environmental housing;
    means attached to the unconstrained end of the sample rod for introducing sinusoidal torsional waves therein;
    means for producing a beam of collimated light and introducing the same into said environmental housing to impinge upon said sample rod;
    means interposed along said beam of light, for splitting said beam of collimated light into two beams;
    means for reflecting one of said split beams, mounted perpendicularly and in a plane parallel to the axis of the rod for successively measuring the rotational displacement of said sample rod along the length thereof, one at the unconstrained end, another at a point midway along its length, and still another at a point one-quarter of the length from the secured end;
    means for combining said split beams reflected from said reflecting means with the other of said split beams; and
    means for counting the interference fringes produced by the combining means, thus determining the torsional displacement of each of said reflecting means at the selected frequency.

* * * * *